United States Patent Office 3,553,118
Patented Jan. 5, 1971

3,553,118
DIIMINE COMPOUNDS AS CATALYSTS FOR THE POLYURETHANE REACTION
Bernardas Brizgys, Southgate, Mich., assignor to Wyandotte Chemicals Corporation, Wyandotte, Mich., a corporation of Michigan
No Drawing. Filed June 21, 1968, Ser. No. 738,772
Int. Cl. C08g 22/34, 22/36
U.S. Cl. 260—18
10 Claims

ABSTRACT OF THE DISCLOSURE

Certain diimine compounds such as 1,2-ethylene bis (isohexylidine imine) have been found to be effective catalysts for the polyurethane reaction. The diimines provide polyurethane compositions which have a pot life of from 0.5 hour to 3 hours, and a rate of cure between 12 to 15 hours at room temperature.

The present invention relates to certain diimine compounds as catalysts for the polyurethane reaction. The invention also relates to low temperature curable polyurethane compositions having a pot life of 0.5 hour to 3 hours and a cure time of 12 to 15 hours at room temperature.

Most of the known catalysts for the polyurethane reaction promote rapid reaction times and quick cures, and generally this is desirable. However, there are those situations where a catalyst is preferred which will initially retard the reaction and yet when the reaction commences, provide a substantially fully cured product in a relatively short period of time. An example of such a situation is in the preparation of polyurethane coating compositions useful as base coats for seamless floors. In this application, it is desirable to provide a composition which has a pot life of at least 0.5 hour and which cures overnight at room temperatures.

It has now been found in accordance with the present invention that a certain group of diimine compounds demonstrates a surprising and efficacious catalytic effect on the polyurethane reaction. It was surprising to find that small amounts of certain diimines are catalysts for the polyurethane reaction since heretofore it was known that these compounds, when converted to the corresponding amines, could be employed as chain-extending or curing agents for isocyanate-terminated polyurethane prepolymers. The select diimine compounds of use in the present invention provide polyurethane compositions which have a pot life of from 0.5 hour to 3 hours, yet cure overnight, that is, in 12 to 15 hours; at room temperatures. The diimine compounds which may be employed in accordance with the present invention may be represented by the formula:

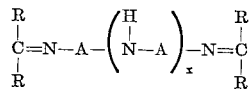

wherein A is alkylene or cycloakylene having from 2 to 15 carbon atoms, x is an integer from 0 to 2, and R is independently selected from the group consisting of hydrogen and alkyl having from 1 to 6 carbon atoms. These compounds are prepared by the reaction of certain carbonyl compounds with aliphatic polyamines. The reaction is well known in the art as evidenced by Schiff, H., ANN 131, 118 (1864). The reaction is acid catalyzed and is generally carried out by refluxing the carbonyl compound and the amine with an azeotroping agent, if necessary, and separating the water as formed.

Representative carbonyl compounds which may be employed in the preparation of the diimines useful in the present invention include ketones such as acetone, butyl ketone, methyl ethyl ketone, and aldehydres such as acetaldehyde, propionaldehyde, and butyraldehyde. Representative aliphatic polyamines which may be employed include diamines such as ethylene diamine, propylene diamine, tetramethylene diamine, and cyclohexylene diamine; triamines such as diethylene triamine, dipropylene triamine, dibutylene triamine, and dicyclohexylene triamine; and tetramines such as triethylene tetramine, tributylene tetramine, tripropylene tetramine, and trihexylene tetramine. The amount of diimine catalyst employed in the present invention may vary considerably, depending upon the reactants and the desired rate of reaction. Generally, however, catalytic amount of diimine compound will be employed, i.e., from about 0.6 part to 7 parts by weight of diimine, based on 100 parts by weight of organic polyol. It is to be understood that the diimine catalysts of the present invention may be employed in the preparation of numerous polyurethane reaction products. Thus, polyurethane foams, elastomers, coatings, and sealants may all be prepared according to the invention. As mentioned above, the catalysts of the invention are particularly suited for use in the preparation of polyurethane base coats for seamless floors since this use requires a polyurethane composition which has a pot life of at least 0.5 hour and cures overnight at room temperatures.

The polyurethanes prepared by the process of the present invention basically comprise the reaction product of an organic polyisocyanate and an organic polyol. If it is desired to prepare a polyurethane coating, then in addition to the above-mentioned materials, a filler, a pigment, and a curing agent are employed. If it is desired to prepare a polyurethane foam, then in addition to the above-mentioned materials, a blowing agent and a stabilizer are generally employed. It is to be understood that the particular reactants employed in the preparation of polyurethane reaction products are well known in the art and vary according to the products desired.

Illustrative organic polyisocyanates which may be employed in accordance with the present invention include aromatic aliphatic, and cycloaliphatic polyisocyanates and combinations thereof. Representative of these types are the diisocyanates such as m-phenylene diisocyanate, tolylene-2,4-diisiocyanate, tolylene-2,6-diisiocyanate, mixtures of 2,4- and 2,6-, hexamethylene-1,6- diisocyante, tertamethylene-1,4 - diisocyanate, cyclohexane-1,4 - diisocyanate, hexahydrotolylene diisocyanate (and isomers), naphthylene-1,5-diisocyanate, 1-methoxyphenyl-2,4-diisocyanate, diphenylmethane-4,4' - diisocyanate, 4,4' - biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4' - diisocyanate; the triisocyanates such as 4,4',4"-triphenylmethane triisocyanate, polymethylene polyphenylisocyanate, and tolylene 2,4,6-triisoycanate; and the tetraisocyanates such as 4,4'-dimethyldiphenylmethane 2,2',5,5'-tetraisocyanate. Especially useful due to their availability and properties are tolylene diisocyanate, diphenylmethane-4,4'-diisocyanate, and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

As used in the present invention, the terms "organic polyisocyanate" also includes isocyanate-terminated polyurethane prepolymers which are prepared by the reaction of an excess amount of any of the above-mentioned organic polyisocyanates with an organic polyol. Any of the organic polyols discussed below may be used.

Representative of the organic polyols which may be employed in accordance with the present invention are those polyols having at least two active hydrogen atoms. The term "active hydrogen atoms" refers to hydrogen atoms which, because of their position in the molecule, display activity according to the Zerewitinoff test as described by Kohler in J. of Am. Chem. Soc., 49, 3181 (1927). Representative organic polyols include polyhydroxyl-containing polyesters, polyalkylene polyether polyols, polyhydroxy-terminated polyurethane polymers, polyhydroxyl-containing phosphorus compounds, aliphatic polyols, and alkylene oxide adducts of polyhydric polythioethers, polyacetals, aliphatic thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also alkylene oxide adducts of compounds which contain one —SH group and one —OH group as well as those which contain an amino group and a —SH group may be used.

Any suitable hydroxyl-containing polyester may be used such as are obtained from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenol such as 2,2-(4,4'-hydroxyphenol)propane, commonly known as Bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)propane and blends thereof having equivalent weights of from 250 to 5000.

Suitable polyhydric polythioethers which may be condensed with alkylene oxides include the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in copending U.S. patent application Ser. No. 728,840, filed May 13, 1968. Preferred polyhydroxyl-containing phosphorus compounds are prepared from alkylene oxides and acids of phosphorus having a $P_2O_5$ equivalency of from about 72% to about 95%.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkane thiols containing at least two —SH groups such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-amino aniline, 1,5-diamino naphthalene, and 2,4-diamino toluene; aliphatic amines such as methyl amine, triisopropanol amine, ethylene diamine, 1,3-propylene diamine, 1,4-butylene diamine, and 1,3-butylene diamine.

Other compounds which do not necessarily fit within any of the previously set forth classes of compounds which are quite suitable in the production of isocyanate-terminated prepolymers include the hydroxy-terminated polyurethane prepolymers such as a hydroxy-terminated prepolymer made by reacting an isocyanate with several moles of an alkylene glycol.

If desired, other catalysts may be employed in addition to the diimine catalyst of the present invention. Any of the standard polyurethane catalysts such as amine and metal salts may be employed. Examples of such catalysts include N-methyl morpholine, triethylene amine, triethylene diamine, tetramethyl ethylene diamine, lead naphthenate, dibutyltin dilaurate, sodium stearate, and zinc octoate.

The polyurethane reaction products may be prepared either by the prepolymer method, the quasi method, or by the one-shot method. These methods are well known in the art. The reaction methods vary with the reactants employed in with the method followed. However, none of the conditions are important insofar as applicant's invention is concerned since the invention resides in the finding that a certain group of diimine compounds imparts unique properties to polyurethane reaction products, however prepared.

The following examples illustrate the invention. All parts are by weight unless otherwise stated.

EXAMPLE I

A 100 percent solids polyurethane coating composition was prepared by blending the following ingredients.

| Ingredient: | Parts |
|---|---|
| 1500 average molecular weight polyalkylene ether triol prepared by the reaction of trimethylolpropane with propylene oxide | 100 |
| Castor oil | 20 |
| Titanium dioxide | 70 |
| Calcium carbonate | 106 |
| Polymethylene polyphenylisocyanate | 53 |
| 1,2-ethylene bis(isohexylidine imine) prepared by the reaction of ethylene diamine with methylisobutylketone | 4.7 |

The composition had a pot life of one hour and cured overnight (16 hours) at 41° F. The example was duplicated (a) employing ethylene diamine as catalyst, (b) employing as catalyst a diimine prepared by the reaction of diethylene triamine and methylisobutylketone [N,N-di(ethylene isohexylidine imine) amine], and (c) employing diethylene triamine as catalyst. The results obtained are presented in Table I below.

TABLE I

| | Ethylene diamine/ methylisobutylketone | Ethylene diamine | Diethylene triamine/ methylisobutylketone | Diethylene triamine |
|---|---|---|---|---|
| Catalyst, parts | 4.7 | 2.0 | 3.6 | 1.4 |
| Pot life, hrs | 1.0 | 6.5 | 1.0 | 4.0 |
| Cure time at— | | | | |
| 76° F., hrs | 14 | 24 | 12 | 20.5 |
| 41° F., hrs | 16 | (¹) | 15 | 45 |

¹ No cure.

From the table, it is apparent that those compositions containing the diimines in accordance with the present invention have the desired balance of pot life and cure time. All of the above compositions were tested as base coats for seamless flooring. Newly laid garage floors are coated with the compositions and allowed to cure. The following day only those floors coated with the compositions of the present invention were sufficiently dry to enable the topcoats to be applied.

EXAMPLE II

This example demonstrates the effectiveness of the catalysts of the present invention when employed in a completely anhydrous unpigmented system. The compositions prepared and physical properties of the cured compositions are presented in Table II. As the data indicate, surprising results are obtained by the use of diimines as catalysts for the polyurethane reaction even in a completely anhydrous system, thus negating the theory that the presence of water had converted the imines to amines which were responsible for the catalyst effect noticed in Example I.

TABLE II

| Ingredients: | | |
|---|---|---|
| Polyalkylene ether triol described in Example I, parts | 100 | 100 |
| Castor oil, parts | 20 | 20 |
| Polymethylene polyphenylisocyanate, parts | 53 | 53 |
| Diethylene triamine/methylisobutylketone [N,N-di(ethylene isohexylidine imine) amine], parts | 3.6 | |
| Ethylene diamine/methylisobutylketone [1,2-ethylene bis(isohexylidine imine)], parts | | 4.7 |
| Physical properties: | | |
| Tensile strength, p.s.i | 940 | 1,120 |
| 100% modulus | 940 | 770 |
| Elongation, percent | 100 | 144 |
| Split tear | 12.1 | 11.0 |
| Shore D Hardness | 16 | 17 |
| Pot life | 1.0 | 1.0 |
| Cure time, at 76° F., hrs | 15 | 15 |

An isocyanate-terminated prepolymer was prepared by charging a reaction vessel with 1040 parts of a mixture of 2,4 and 2,6-isomers of toluene diisocyanate, 3000 parts of the triol described in Example I, and 30 parts of dibutyltin mercaptide. The reaction mixture was maintained at a temperature of 120° F. to 140° F. for about two hours. The prepolymer which resulted was then cooled to room temperature. Analysis indicated that the prepolymer contained an unreacted isocyanate content of 5.9%.

Two-component polyurethane compositions were prepared employing the above-described prepolymer as one component thereof. The compositions prepared are described in Table III. As the results indicate, only the composition prepared employing a diimine of the present invention had a sufficiently long pot life and yet cured overnight at room temperature.

TABLE III

| Component: | | | |
|---|---|---|---|
| Isocyanate-terminated prepolymer, parts | 100 | 100 | 100 |
| Organic polyol, parts | 88.7¹ | 79.7 | 88.7 |
| Castor oil, parts | 20 | 20 | 20 |
| Polymethylene polyphenylisocyanate, parts | 44 | 44 | 44 |
| Calcium carbonate, parts | 136 | 136 | 136 |
| Titanium dioxide, parts | 10 | 10 | 10 |
| Diethylene triamine/methylisobutylketone [N,N-di(ethylene isohexylidine imine)] amine, parts | | 2 | |
| Dibutyltin mercaptide, parts | | | 2 |
| Pot life, hours | 9.5 | 1.5 | 0.33 |
| Cure time, at 76° F | >15 | 12–14 | 15 |

¹ 740 average molecular weight polyalkylene ether triol prepared by the reaction of trimethylolpropane with propylene oxide.

What is claimed is:

1. In a process for the preparation of polyurethane reaction products comprising the reaction of an organic polyisocyanate and an organic polyol, the improvement which comprises carrying out the reaction in the presence of a catalytic amount of a diimine compound of the formula

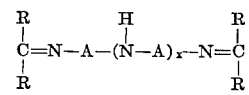

wherein A is alkylene or cycloalkylene having from 2 to 15 carbon atoms, x is an integer from 0 to 2, and R is independently selected from the group consisting of hydrogen and alkyl having from 1 to 6 carbon atoms.

2. The process of claim 1 wherein the diimine compound is 1,2-ethylene bis(isohexylidine imine).

3. The process of claim 1 wherein the diimine compound is [N,N-di-(ethylene isohexylidine imine)]amine.

4. The process of claim 1 wherein the reaction is carried out in the presence of from 0.6 part to 7 parts by weight of diimine based on 100 parts of organic polyol.

5. The process of claim 1 wherein the organic polyisocyanate is an isocyanate-terminated polyurethane prepolymer prepared by the reaction of an excess amount of an organic polyisocyanate with an organic polyol.

6. The process of claim 1 wherein the organic polyisocyanate is polymethylene polyphenylisocyanate.

7. A polyurethane coating composition comprising an organic polyisocyanate, an organic polyol, and from 0.6 part to 7 parts, based on 100 parts of said polyol, of a diimine of the formula

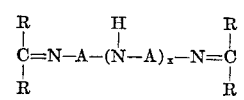

wherein A is alkylene or cycloalkylene having from 2 to 15 carbon atoms, $x$ is an integer from 0 to 2, R is independently selected from the group consisting of hydrogen and alkyl having from 1 to 6 carbon atoms.

8. The composition of claim 7 when the diimine is 1,2-ethylene bis(isohexylidine imine).

9. The composition of claim 7 when the diimine is [N,N-di(ethylene isohexylidine imine)]amine.

10. The composition of claim 7 when the organic polyisocyanate is an isocyanate-terminated polyurethane prepolymer prepared by the reaction of an excess amount of an organic polyisocyanate with an organic polyol.

References Cited

UNITED STATES PATENTS 3,004,933 10/1961 Muller et al. _____ 260—2.5
3,050,475 8/1962 Muller et al. _____ 260—2.5

DONALD E. CZAJA, Primary Examiner

M. J. WELSH, Assistant Examiner

U.S. Cl. X.R.

260—2.5, 75, 77.5